(12) United States Patent
Chou et al.

(10) Patent No.: US 7,267,884 B2
(45) Date of Patent: Sep. 11, 2007

(54) ETHYLENE COPOLYMER-MODIFIED POLYAMIDE PRODUCT

(75) Inventors: Richard T. Chou, Hockessin, DE (US); Loic Pierre Rolland, Divonne les Bains (FR); Sam Louis Samuels, Landenberg, PA (US); David J. Walsh, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 93 days.

(21) Appl. No.: 11/072,387

(22) Filed: Mar. 4, 2005

(65) Prior Publication Data

US 2005/0203253 A1  Sep. 15, 2005

Related U.S. Application Data

(60) Provisional application No. 60/550,400, filed on Mar. 5, 2004.

(51) Int. Cl.
*C08L 5/00* (2006.01)
*C08L 77/00* (2006.01)
*C08L 77/06* (2006.01)
*B32B 27/34* (2006.01)

(52) U.S. Cl. .............. 428/474.4; 428/98; 428/357; 428/364; 428/475.5; 428/910; 442/181; 442/199; 442/304; 442/327; 525/183

(58) Field of Classification Search ........... 428/910, 428/474.4, 475.5, 98, 357, 364; 525/183; 442/181, 199, 304, 327
See application file for complete search history.

(56) References Cited

U.S. PATENT DOCUMENTS

| | | | |
|---|---|---|---|
| 3,548,028 A | | 12/1970 | Itabashi et al. |
| 5,614,574 A | | 3/1997 | Sheth |
| 2002/0142179 A1 | * | 10/2002 | Nanba et al. ............ 428/474.4 |

FOREIGN PATENT DOCUMENTS

| | | |
|---|---|---|
| EP | 0035796 | 9/1981 |
| EP | 0041327 | 12/1981 |
| EP | 0080274 | 6/1983 |
| EP | 0 119 982 A2 | 9/1984 |
| EP | 0119982 * | 9/1984 |
| EP | 0 737 708 A1 | 10/1996 |
| EP | 0737708 * | 10/1996 |
| JP | 56-85420 | 7/1981 |
| WO | WO 02/055768 A1 | 7/2002 |

* cited by examiner

*Primary Examiner*—Ana Woodward

(57) ABSTRACT

Disclosed are films, tapes, and melt-spun fibers comprising or prepared from a composition comprising (a) at least one polyamide polymer; and (b) from about 0.1 to 20 weight % of at least one ethylene copolymer such as ethylene/vinyl acetate dipolymers, ethylene/vinyl acetate terpolymers, ethylene/alkyl (meth)acrylate dipolymers, ethylene/alkyl (meth)acrylate terpolymers, functionalized ethylene copolymers, ethylene/acid copolymers, and salts thereof. The films, tapes and fibers exhibit improved tensile properties such as tensile strength and elongation at break compared to non-modified polyamide compositions. Also disclosed are nonwoven textiles comprising or prepared from the oriented melt-spun fibers.

31 Claims, No Drawings

ETHYLENE COPOLYMER-MODIFIED POLYAMIDE PRODUCT

This application claims the benefits of U.S. provisional application No. 60/550,400, filed Mar. 5, 2004, the entire disclosure of which is incorporated herein by reference.

This invention relates to polyamides modified with ethylene copolymers and to films, tapes, fibers, and nonwoven textiles produced therefrom.

BACKGROUND OF THE INVENTION

Oriented films may be formed from the molten polymer by a number of methods known in the art (for example, cast film extrusion or blown film extrusion). Films can be oriented in one direction by hot-drawing in the machine direction with a tensioning device, and annealing. Films can also be oriented in two directions (machine direction and transverse direction) by suitable tensioning devices. Oriented polyamide films are useful for a wide variety of packaging applications.

Tapes may be prepared from extruded films. Flat films can be extruded into a cooling water bath or onto chilled rolls for quenching. Alternatively, a tubular blown film can be extruded through an annular die and air-quenched. The quenched film is then knife-slit into tapes. The tapes are then stretched (i.e. uniaxially oriented) to several times their original length by hot-drawing in the machine direction with a tensioning device and annealing the stretched tapes having controlled widths (for example from about 1 cm to about 5 cm). Polyamide tapes can be used in a number of applications. For example, tapes can be coated with a variety of appropriate adhesives to prepare adhesive tapes.

Fibers may be formed directly from the molten polymer by a number of methods known in the art, including melt-spinning, centrifugal spinning and melt-blowing.

Melt-spun or melt-blown fibers can be used in nonwoven textiles suitable for applications such as carpet backing, agrotextiles and geotextiles.

Polyamide fibers can be used in twines or ropes or to prepare yarns for carpets. Polyamide yarns also can be woven or knitted into fabrics used in applications such as tarpaulins, liners, banners, sacking, carpet backing, agrotextiles and geotextiles.

It is desirable to provide oriented polyamide films, tapes and fibers with improved mechanical properties such as tensile breaking load, tenacity (tensile breaking stress) and elongation at break. To reduce the cost of stretched slit-film tapes it is desirable to reduce the denier (similar width but lower thickness) of the tape and/or increase the amount of inert filler such as $CaCO_3$ in the polyamide formulation. Polyamide fibers with improved mechanical properties have been prepared by adding small amounts of additives to polyester. See, e.g., EP 80274B1, EP 35796B1, EP 41327B1 and JP 56-85420.

With known polyamide compositions, however, it is difficult to achieve the desired improvements. Higher stretch ratios and reduced denier can result in unacceptable loss of physical properties. Undesirable fibrillation of polyamide tapes under high stretch ratios is desirably overcome.

It also remains desirable to enhance the draw efficiency and the flex fatigue resistance of oriented films, tapes, and fibers with low deniers or thicknesses.

SUMMARY OF THE INVENTION

Accordingly, this invention provides an article comprising, or prepared from, a composition which comprises (a) at least one polyamide polymer; and (b) at least one E/X/Y copolymer wherein the article is an oriented film or an oriented fiber;

the E/X/Y copolymer is present from 0.1 to 20, or 0.1 to 15, weight % of the composition;

E comprises ethylene;

X is a one or more monomer selected from the group consisting of vinyl acetate and alkyl (meth)acrylic esters;

Y is one or more comonomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters, and salts thereof, glycidyl acrylate, glycidyl methacrylate, and glycidyl vinyl ether; and X is from 0 to 50 weight % of the E/X/Y copolymer, Y is from 0 to 35 weight % of the E/X/Y copolymer, the weight % of X and Y cannot both be 0, and E is the remainder.

Also provided is an oriented film comprising:

(a) at least one polyamide polymer; and (b) from 0.1 to 20 weight % of at least one E/X/Y copolymer wherein E comprises ethylene; X is a monomer selected from the group consisting of vinyl acetate and alkyl (meth)acrylic esters; and Y is one or more additional comonomers selected from the group consisting of carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoester, and salts thereof; glycidyl acrylate, glycidyl methacrylate, and glycidyl vinyl ether; wherein X is from 0 to 50 weight % of said E/X/Y copolymer, Y is from 0 to 35 weight % of said E/X/Y copolymer, wherein the weight % of X and Y cannot both be 0, and E being the remainder; wherein the film is prepared by drawing at a temperature below the melting point of the polyamide at draw ratios of equal to or greater than 3.

A preferred embodiment is a film prepared from a composition comprising (a) at least one polyamide polymer; and (b) from 0.5 to 10 weight % of at least one ethylene/alkyl acrylate copolymer.

This invention also provides a slit film tape prepared from said film.

This invention further provides an oriented melt-spun fiber prepared from a composition comprising:

(a) at least one polyamide polymer; and (b) from 0.1 to 15 weight % of at least one E/X/Y copolymer wherein E comprises ethylene; X is a monomer selected from the group consisting of vinyl acetate and alkyl (meth)acrylic esters; and Y is one or more additional comonomers selected from the group consisting of carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoester, and salts thereof; glycidyl acrylate, glycidyl methacrylate, and glycidyl vinyl ether; wherein X is from 0 to 50 weight % of said E/X/Y copolymer, Y is from 0 to 35 weight % of said E/X/Y copolymer, wherein the weight % of X and Y cannot both be 0, and E being the remainder; wherein the fiber is drawn at a temperature below the melting point of the polyamide to a draw ratio greater than 3.

A preferred embodiment is a melt-spun fiber prepared from a composition comprising
(a) at least one polyamide polymer; and
(b) from 0.5 to 10 weight % of at least one ethylene/alkyl acrylate copolymer.

This invention also provides nonwoven textiles prepared from oriented melt-spun fibers as described above.

This invention also provides films, slit film tapes, fibers (e.g. melt-spun fibers) and nonwoven textiles wherein the composition described above further comprises (c) from 0.01 to 20 weight % of at least one additional component selected from the group consisting of fillers, delustrants, thermal and ultraviolet stabilizers, ultraviolet absorbers, antistatic agents, terminating agents, fluorescent whitening agents, pigments and other additives.

DETAILED DESCRIPTION OF THE INVENTION

The invention relates to the enhancement of the mechanical properties such as tensile breaking load, tensile modulus, tenacity (tensile breaking stress) and elongation at break (%) of stretched polyamide films and tapes and enhancement of draw efficiency, flex fatigue resistance, tenacity and elongation at break (%) of melt spun polyamide fibers. One or more of these enhancements may be achieved by incorporating a small percentage (from about 0.1 to about 20, preferably from about 0.5 to about 10 weight %, alternatively from about 1 to 7 weight %) of an ethylene copolymer such as ethylene/vinyl acetate dipolymers, ethylene/vinyl acetate terpolymers, ethylene/alkyl (meth)acrylate dipolymers, ethylene/alkyl (meth)acrylate terpolymers, functionalized ethylene copolymers, ethylene/acid copolymers, and salts thereof into the polyamide formulations used to prepare the films and fibers (the polyamide formulations may optionally contain other materials selected from fillers such as $CaCO_3$ and additives such as UV stabilizers, pigments etc.). Blending an ethylene copolymer with a polyamide also improves the processability of the polyamide resin by, for example, increasing the melt strength of the molten polyamide resin. These blends also typically provide improved stretchability for films and fibers over conventional polyamide films and fibers.

The drawability of tapes prepared from these blends is also generally improved during manufacturing. For example, the blends allow increased draw ratios with no or reduced tape fibrillation. Moreover, the physical properties of polyamide formulations processed by cooling a cast film (before slitting) on a chilled roll are less favorable than are those of formulations processed by using a chilled water bath. The stretchability of a film cooled on a chilled roll is poor, because the slower cooling results in a more crystalline film. The incorporation of ethylene copolymers usually enhances the stretchability of the films and overcomes or reduces the fibrillation of the slit film tapes prepared from such films in subsequent drawing. Incorporation of ethylene copolymers may also improve continuity and/or reduce breaks in processing oriented films. It may also provide a reduction in energy consumption during processing, reducing extruder torque. It generally also enhances the drawability of melt-spun fibers and enhances the tensile properties of the drawn fibers.

As indicated above, the oriented films, tapes and fibers of this invention comprise a polyamide resin and an ethylene copolymer. The polyamide resin and the ethylene copolymer are thermoplastic materials, that is, they flow when heated under pressure.

Polyamides (nylon), and in particular nylon-6, are engineering polymers that can be used for many applications. Polyamides useful in the invention are well known to those skilled in the art. Such polyamides are generally prepared from lactams or amino acids (e.g. nylon-6 or nylon-11), or prepared from condensation of diamines such as hexamethylene diamine with dibasic acids such as succinic, adipic, or sebacic acid. Copolymers and terpolymers of these polyamides are also suitable.

Preferred polyamides include, without limitation, polyepsiloncaprolactam (nylon-6), polyhexamethylene adipamide (nylon-66), nylon-9, nylon-10, nylon-11, nylon-12, nylon-12,12 nylon-6I, and copolymers and terpolymers such as nylon-6/66, nylon-6/9, nylon-6/10, nylon-6/12, nylon-66/12, nylon-6/66/610 and nylon-6/6T. More preferred polyamides include polyepsiloncaprolactam (nylon-6), polyhexamethylene adipamide (nylon-66), and still more preferred is nylon-6. Of particular note are nylon 6, nylon 66, nylon 6/12, nylon 11, nylon 12, or a blend of two or more of nylon 6, nylon 66, nylon 6/12, nylon 11, and nylon 12.

Although these polyamides described above are the preferred polyamides, other polyamides such as amorphous polyamides are not explicitly excluded. The term "polyamide" when used herein is used generically to refer to any or all of the polymers described above.

Suitable ethylene copolymers E/X/Y copolymers wherein E comprises ethylene, X is a comonomer selected from the group consisting of vinyl acetate and alkyl (meth)acrylic acid esters; and Y comprises one or more additional comonomers such as, e.g., carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoesters, and salts thereof; glycidyl acrylate, glycidyl methacrylate, and glycidyl vinyl ether.

In this connection, the term "(meth)acrylic acid," and the abbreviation "(M)AA," refers to methacrylic acid and/or acrylic acid. Likewise, the terms "(meth)acrylate" and "alkyl (meth)acrylate" refer to esters of methacrylic acid and/or acrylic acid.

Examples of alkyl (meth)acrylates include methyl (meth)acrylate (abbreviated M(M)A), ethyl (meth)acrylate (abbreviated E(M)A) and butyl (meth)acrylate (abbreviated B(M)A). Of note are ethylene/vinyl acetate dipolymers, ethylene/vinyl acetate terpolymers, ethylene/alkyl (meth)acrylate dipolymers, ethylene/alkyl (meth)acrylate terpolymers, functionalized ethylene copolymers, ethylene/acid copolymers, and salts thereof.

In general, the amount of X may range up to about 50 weight %, and is preferably less than or equal to 40 weight %, based on the total weight of the E/X/Y copolymer. The amount of Y may range up to about 35 weight %, based on the total weight of the E/X/Y copolymer. The total amount of X and Y may not be equal to zero. In other words, the ethylene copolymer preferably contain a finite amount of X and/or Y.

When X comprises an alkyl (meth)acrylic acid ester, the alkyl group is a $C_1$ to $C_{10}$, branched or unbranched, saturated hydrocarbyl group. $C_{1-8}$ alkyl groups are preferred, and $C_1$ to $C_6$ alkyl groups are more preferred. Preferably, the alkyl group in the alkyl (meth)acrylate comonomer has from one to four carbon atoms. Examples of preferred alkyl (meth)acrylates include methyl acrylate, ethyl acrylate and butyl acrylate. Still more preferably, the alkyl group in the alkyl (meth)acrylate comonomer is methyl.

Also preferably, the alkyl (meth)acrylate comonomer has a concentration range of from 5 to 35 weight % of the ethylene copolymer, preferably from 10 to 30 weight percent or from 10 to 25 weight %. Of note are ethylene alkyl acrylate copolymers comprising 25 weight % of alkyl acrylate, based on the total weight of the ethylene copolymer. In certain embodiments of the invention, the amount of Y is zero. In other embodiments of note, the amount of X is zero.

The relative amount and choice of the X and Y comonomers present in the ethylene copolymer can be viewed as contributing to how and to what degree the resulting copolymer is to be viewed as a polar polymeric constituent in the thermoplastic composition.

Suitable Y components include, without limitation, comonomers selected from the group consisting of carbon monoxide, sulfur dioxide, acrylonitrile. Of note are E/X/Y terpolymers such as ethylene/methyl acrylate/carbon monoxide (E/MA/CO), ethylene/ethyl acrylate/carbon monoxide (E/EA/CO) and ethylene/n-butyl acrylate/carbon monoxide (E/n-BA/CO), and ethylene/vinyl acetate/carbon monoxide (E/VA/CO).

Other suitable Y components include (meth)acrylic acid. Of note are ethylene/acid copolymers including E/(M)AA dipolymers having from about 2 to about 30 weight % (M)AA. These copolymers can be defined in the context of this invention as an E/X/Y copolymer wherein the weight % of X is 0 and Y is (meth)acrylic acid with a weight % of from about 2 to about 30 weight %, the remainder being ethylene.

In certain embodiments, the ethylene copolymer is an E/X/Y terpolymer wherein E is ethylene, X is selected from the group consisting of $C_1$ to $C_8$ alkyl (meth)acrylate esters and Y is (meth)acrylic acid. Suitable ethylene/acid terpolymers include ethylene/n-butyl (meth)acrylate/(meth)acrylic acid terpolymers, ethylene/iso-butyl (meth)acrylate/(meth)acrylic acid terpolymers, ethylene/methyl (meth)acrylate/(meth)acrylic acid terpolymers, and ethylene/ethyl (meth)acrylate/(meth)acrylic acid terpolymers.

Ethylene/acid copolymers as described above may be at least partially neutralized into salt form. At least one cation, such as an alkali metal, transition metal, or alkaline earth metal cation, preferably lithium, sodium, potassium, magnesium, calcium, or zinc, or a combination of these cations, is used to neutralize some portion of the acidic groups in the copolymer. These neutralized acid copolymers are commonly referred to as ionomeric resins ("ionomers"). Preferably at least 30%, alternatively at least 45%, alternatively at least 50%, alternatively at least 60% of the available acid moieties in the ethylene copolymer are neutralized.

Ionomers useful in this invention include those prepared from E/(M)AA dipolymers having from about 2 to about 30 weight % (M)AA. Various ionomeric resins are sold by E. I. du Pont de Nemours and Company under the trademark Surlyn® and by the Exxon Corporation under the tradenames "Escor" and "Iotek."

Also suitable as Y components in the E/X/Y copolymers are functionalizing comonomers than can be used to produce functionalized ethylene copolymers. The term "functionalized ethylene copolymers" as used herein denotes copolymers of ethylene that incorporate reactive functional groups such as anhydrides and epoxides that can react with other components by, for example, covalent bonding. Of particular note are the functionalized ethylene copolymers described in U.S. Pat. No. 5,700,890, issued to Chou.

Accordingly, suitable functionalizing comonomers Y include, for example, maleic anhydride and maleic diesters or monoesters (maleic half-esters) including esters of $C_{1-4}$ alcohols, such as, for example, methyl, ethyl, n-propyl, isopropyl, and n-butyl alcohols. Of note is an ethylene/maleate copolymer that includes maleic anhydride. Also of note is an ethylene/maleate copolymer that includes maleic acid monoesters. When the ethylene copolymer includes residues of maleic acid or the monoester of maleic acid, these moieties may be neutralized to their salt form. The preferred ions and neutralization levels are as described above for ionomers. Of note is a maleated ethylene copolymer that is neutralized with zinc ions. Also of note is a maleated ethylene copolymer that is neutralized to a level of about 40%. Also of note is a copolymer of ethylene, methacrylic acid, and the monoester of maleic acid. Copolymers of particular note are available commercially from DuPont under the trademark Surlyn®.

Maleated ethylene copolymers (maleated polyethylene) may be synthesized by grafting. Grafted E/X/Y copolymers as described herein include copolymers wherein a portion of the E component comprises an alpha-olefin other than ethylene, such as butene, hexene or octane, to modify the density of the copolymer. An example of a grafted maleic anhydride modified linear high-density polyethylene is a product sold under the trademark Polybond® 3009 available from Crompton Corporation. Similar maleated polyolefins are sold under the trademark Fusabond® available from DuPont. Typical grafted E/X/Y copolymers are those wherein maleic anhydride is incorporated in a range from about 0.3 to about 2 weight % based on the total weight of the ethylene copolymer.

Ethylene copolymers that include reactive functional groups such as maleic anhydride can also be readily obtained by a high-pressure free radical process. A high-pressure process suitable for use in preparing such copolymers is described, for example, in U.S. Pat. No. 4,351,931. This eliminates the secondary process step of grafting traditionally used to create maleic anhydride-functionalized polymers. In addition, it is easier to obtain maleic anhydride incorporation to levels greater than 2 weight % using this process than by grafting. More specifically, copolymers prepared from ethylene and a functional comonomer prepared by this process can comprise from about 3 weight % to about 15 weight % of the functional comonomer. Of note are copolymers such as ethylene/maleic anhydride (E/MAH), ethylene/ethyl hydrogen maleate (also known as ethylene/maleic acid monoester, or E/MAME) copolymer, and E/MMA/MAME copolymers, which are synthesized directly in high-pressure autoclaves.

Also suitable as Y components in the E/X/Y copolymers useful in this invention are epoxy-functionalized comonomers such as glycidyl acrylate, glycidyl methacrylate, or glycidyl vinyl ether (i.e. comonomers containing moieties derived from 2,3-epoxy-1-propanol).

Preferred epoxy-functionalized copolymers useful in this invention may be represented by the formula: E/X/Y, where E is the copolymer unit —$(CH_2CH_2)$— derived from ethylene; X is the copolymer unit —$(CH_2CR^1R^2)$—, where $R^1$ is hydrogen or methyl, and $R^2$ is carboalkoxy of 1 to 10 carbon atoms (X for example is derived from alkyl acrylates, alkyl methacrylates) or acetyloxy; and Y is the copolymer unit —$(CH_2CR^3R^4)$—, where $R^3$ is hydrogen or methyl and $R^4$ is carboglycidoxy or glycidoxy (Y for example is derived from glycidyl acrylate, glycidyl methacrylate, or glycidyl vinyl ether).

Preferred for this embodiment of the invention, useful E/X/Y copolymers are those wherein X is 5 to 50 weight % of said E/X/Y copolymer, Y is 0.3 to 15 weight % of said E/X/Y copolymer, E being the remainder.

More preferably, the comonomer containing the glycidyl moiety (e.g., glycidyl acrylate or glycidyl methacrylate) is about 0.3 (or about 0.5) weight % to about 8 (or about 10)

weight % and the alkyl acrylate is from about 5 to about 40 (preferably about 20 to about 40 or about 25 to about 35) weight % of the total weight of the epoxy-functionalized ethylene copolymer.

Of note are copolymers such as ethylene/methyl acrylate/ glycidyl methacrylate (E/MA/GMA), ethylene/ethyl acrylate/glycidyl methacrylate (E/EA/GMA) and ethylene/n-butyl acrylate/glycidyl methacrylate (E/n-BA/GMA).

It is also preferred that the epoxide-containing monomers, and more preferably the glycidyl-containing monomers, are incorporated into the reactant copolymer by the concurrent reaction of monomers and are not grafted onto a polymer by graft polymerization.

Suitable ethylene/alkyl (meth)acrylate copolymers can be prepared by processes well known in the polymer art using either autoclave or tubular reactors. The copolymerization can be run as a continuous process in an autoclave: ethylene, the alkyl (meth)acrylate, and optionally a solvent such as methanol (see U.S. Pat. No. 5,028,674) are fed continuously into a stirred autoclave of the type disclosed in U.S. Pat. No. 2,897,183, together with an initiator. The rate of addition may depend on variables such as the polymerization temperature, pressure, alkyl (meth)acrylate monomer employed, and concentration of the monomer in the reaction mixture needed to achieve the target composition of the copolymer. In some cases, it may be desirable to use a telogen such as propane, to control the molecular weight. The reaction mixture is continuously removed from the autoclave. After the reaction mixture leaves the reaction vessel, the copolymer is separated from the unreacted monomers and solvent (if solvent was used) by conventional means, e.g., vaporizing the nonpolymerized materials and solvent under reduced pressure and at an elevated temperature.

A "tubular reactor produced" ethylene copolymer is an ethylene copolymer produced at high pressure and elevated temperature in a tubular reactor and is stiffer and more elastic than autoclave produced ethylene/alkyl acrylate copolymers. As generally recognized in the art, such a tubular reactor copolymerization technique may produce a copolymer having a greater relative degree of heterogeneity along the polymer backbone (a more blocky distribution of comonomers), which tends to reduce the presence of long chain branching, and which may produce a copolymer characterized by a higher melting point than one produced at the same comonomer ratio in a high pressure stirred autoclave reactor. Tubular reactor produced ethylene/alkyl (meth)acrylate copolymers are commercially available from DuPont.

Similar ethylene/alkyl (meth)acrylate copolymeric material can be produced in a series of autoclave reactors in which comonomer replacement is achieved by multiple zone introduction of comonomer as disclosed in U.S. Pat. Nos. 3,350,372; 3,756,996; and 5,532,066, and as such these high melting point materials may be considered equivalent for purposes of this invention.

The specific selection of the grade of ethylene/alkyl (meth)acrylate copolymer to be used in the invention may be influenced by balancing factors such as melt indices of the modifier and the polyamide, the draw temperature of the formulated blend relative to the respective softening points of the ethylene/alkyl acrylate copolymer and the polyamide, and the draw profile (draw rate and draw ratio) that is desired. Other factors to be considered include increased elastic recovery associated with higher relative molecular weight copolymer (such as an E/25 weight % MA with a 0.7 MI) and the pragmatic ability of a relatively lower molecular copolymer (such as an E/20 weight % MA with an 8 MI) to more easily blend with fillers. Of note are an EMA comprising 24 weight % methyl acrylate with a melt index (MI) of 2 and an EMA comprising 20 weight % methyl acrylate with an MI of 8.

The compositions useful in this invention may optionally further comprise fillers such as $CaCO_3$, and other additives such as delustrants such as $TiO_2$, thermal and ultraviolet (UV) stabilizers, UV absorbers, antistatic agents, terminating agents, fluorescent whitening agents, pigments, or other additives that are conventional in the art of polyamide films and melt spun fibers. These conventional ingredients may be present in the compositions according to this invention in quantities that are generally from 0.01 to 20 weight %, or from 0.1 to 15 weight %.

The optional incorporation of such conventional ingredients into the compositions comprising polyamide and ethylene copolymer can be carried out by any known process. This incorporation can be carried out, for example, by dry blending, by extruding a mixture of the various constituents, by the conventional masterbatch technique, adding a concentrate of the additive, adding the additive such as a filler mixed in a polymeric carrier, or the like. A typical masterbatch may comprise from 75 to 90 weight % of $CaCO_3$. Of note is the use of a masterbatch comprising $CaCO_3$ and the ethylene copolymer. Further information about suitable levels of additives and methods of incorporating them into polymer compositions may be found in standard reference texts.

The mechanical properties such as tenacity, tensile breaking load, elongation at break and denier of the films, tapes and fibers of this invention can be balanced by adjusting various parameters including resin formulation design (base resin, level and types of additives such as $CaCO_3$, UV stabilizers, pigment added);

amount and type of ethylene copolymer used;

processing equipment (quenching, slitting, drawing and annealing configuration); and processing conditions (extruder screw configuration, temperature profile and polymer throughput, stretch and annealing temperatures and profiles, line speed, etc).

Typically, a manufacturing facility for preparing films or fibers may have a limited ability to modify equipment and processing conditions. Therefore, ethylene copolymer modification of the polyamide resin as described herein can provide significant improvement in mechanical properties of the polyamide films, tapes and fibers prepared without introducing retooling costs.

The thermoplastic compositions described herein are suitable for preparation of films by any means of processing that is suitable for thermoplastic compositions. Extrusion processing is the most typical method. The films are useful in a wide variety of packaging applications, including shrink film, and for preparing slit film tapes.

For the purposes of the invention, the film can be either a single layer or multilayer polymeric film. The multilayered films comprise more than one layer including, for example, tie layers, which may or may not include the polyamide and ethylene copolymer that define the films and fibers of the invention, provided that the presence of the other layers does not negate the favorable properties of the layer or layers comprising the polyamide and ethylene copolymer. Methods of forming multilayered film structures, by casting or coextrusion, e.g., are well known in the art. Various additives as generally practiced in the art can be present in any layer or layers of the multilayered film structures, again provided that their presence does not negate the properties of the film of the invention. Thus, it is contemplated that various additives such as antioxidants and thermal stabilizers, ultraviolet (UV) light stabilizers, pigments and dyes, fillers, delustrants, anti-slip agents, plasticizers, other processing aids, and the like may be advantageously employed.

Films of this invention can be made by virtually any method of extrusion processing known to those skilled in this art. For example, a primary film may be manufactured by extruding the said compositions using so-called "blown film" or "flat die" methods. A blown film is prepared by extruding the polymeric composition through an annular die and expanding the resulting tubular film with an air current to provide a blown film. Cast flat films are prepared by extruding the composition through a flat die. The film leaving the die is cooled by at least one roll containing internally circulating fluid (a chill roll) or by a water bath to provide a cast film. A film of this invention would have a width, for example, of about 60 cm (two feet).

A film of the invention can be further oriented beyond the immediate quenching or casting of the film. The process comprises the steps of extruding a laminar flow of molten polymer, quenching the extrudate and orienting the quenched extrudate in at least one direction. "Quenched" as the term is used herein describes an extrudate that has been substantially cooled below its melting point in order to obtain a solid film material.

The film may be uniaxially oriented, but is preferably biaxially oriented by drawing in two mutually perpendicular directions in the plane of the film to achieve a satisfactory combination of mechanical and physical properties. Advantageously, films of the invention may be drawn at temperatures below the melting point of the neat polyamide. The drawing ratio may generally be about 2:1 or greater, about 3:1 or greater, about 4:1 or greater, or about 6:1 or greater. The draw ratio may be in the range of 3:1 to about 16:1 and a typical drawing ratio for some compositions may be from about 4:1 to about 10:1.

Those of skill in the art are aware that, in general, the maximum possible draw ratio cannot be reached along both axes, when orienting a film biaxially. Accordingly, the draw ratio of a biaxially oriented film is defined herein as the product of the draw ratio along each axis.

Those of skill in the art are also aware that proper moisture conditioning of the polyamide may be required to allow one to draw to the relatively large draw ratios at which the beneficial effects of adding the ethylene copolymer can best be observed.

Orientation and stretching apparatus to uniaxially or biaxially stretch film are known in the art and may be adapted by those skilled in the art to produce films of the invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

A blown film of the invention may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which may induce longitudinal orientation.

The processing to obtain an oriented blown film is known in the art as a double bubble technique, and can be carried out as disclosed in U.S. Pat. No. 3,456,044. A primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties.

In one embodiment, the film is formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion, which corresponds to the length dimension of the slit film yarns. Alternatively, the film may be formed through a blowing process known to those skilled in this art.

Preferred films of this invention include:

Preferred 1. The film wherein X comprises an alkyl acrylate that is present in said ethylene/alkyl acrylate copolymer in a range from about 5 to about 35 weight %.

Preferred 2. The film of Preferred 1 wherein said alkyl acrylate is present in said ethylene/alkyl acrylate copolymer in a range from about 10 to about 30 weight %.

Preferred 3. The film of Preferred 2 wherein said alkyl acrylate is selected from the group consisting of methyl acrylate, ethyl acrylate and butyl acrylate.

Preferred 4. The film of Preferred 3 wherein said alkyl acrylate is methyl acrylate.

Preferred 5. The film of any of Preferred 1 through Preferred 4 wherein component (b) is present in an amount of from 1 to 7 weight %.

Preferred 6. The film of any of Preferred 1 through Preferred 5 further comprising (c) from 0.01 to 20 weight % of at least one additional component selected from the group consisting of fillers, delustrants, thermal and ultraviolet stabilizers, ultraviolet absorbers, antistatic agents, terminating agents, fluorescent whitening agents, pigments and other additives.

Preferred 7. The film of Preferred 6 wherein the additional component (c) is present in an amount between 0.1 and 15 weight %.

Preferred 8. The film of any of Preferred 1 through Preferred 7 wherein comprising a tubular reactor produced ethylene/alkyl acrylate copolymer.

Of note is a film that is prepared by extrusion of a composition as described herein into a cooling water bath for quenching. Also of note is a film that is prepared by extrusion of a composition as described herein onto chilled rolls for quenching. Also of note is a film that is prepared by extrusion of a composition as described herein through an annular die into a tubular blown film that is air-quenched. Of particular note is a biaxially oriented film comprising poly-epsiloncaprolactam (nylon-6) modified with at least one ethylene/alkyl acrylate copolymer.

This invention also provides slit film tapes prepared from films of this invention. Preferred tapes are those prepared from the preferred films above. The film may be drawn after quenching and prior to slitting. Preferably, however, a primary nonoriented film is slit into tapes that are drawn before being reeled up. The slit film tapes can be produced with a slitting apparatus that comprises a support frame; a plurality of substantially planar cutting blades, each of which includes opposed cutting edges and opposed ends; a mounting structure for mounting the cutting blades to the support frame; and a feed roll attached to the support frame and configured to feed film in a downstream direction over the exposed cutting edges of the blades. The mounting structure is configured to mount the cutting blades in substantially aligned, parallel and spaced apart relationship, wherein the blades are mounted such that each blade has one of its cutting edges exposed for cutting, and wherein the cutting edges of adjacent blades are spaced apart from each other.

After slitting the film into tapes as described above, the drawing operation would be done over a span of from 3 to 6 meters (ten to twenty feet) in an oven heated to a temperature effective to soften the film so as to facilitate the drawing operation. What typically takes place is that the film is cold at the beginning of the path through the oven and is progressively heated and softened as it passes through the oven. Necking takes place at a neckline that is at a certain distance from the entrance to the oven. The location of the necking zone depends on a number of factors including the rate of stretching, the temperature of the oven, and the nature and thickness of the film material. A typical pre-stretched tape may have, for example, a thickness about 120 microns and a width of about 3 cm to about 15 cm. After stretching, the final tape has a thickness of about 30 to 50 microns and a width of about 1 cm to about 5 cm. Tapes can be made wider or narrower for certain purposes. Advantageously, tapes of the invention may be drawn at temperatures below the melting point of the neat polyamide. The oriented fibers that result from drawing a slit film tape are referred to herein as "slit film fibers".

The drawing ratio may generally be about 2:1 or greater, about 3:1 or greater, about 4:1 or greater, or about 6:1 or greater. The draw ratio may be in the range of 3:1 to about 16:1 and a typical drawing ratio for some compositions may be from about 4:1 to about 10:1. The distance over which longitudinal drawing takes place may vary with the technique used. In the short-draw the stretching takes place over a distance of a few inches; other techniques involve much greater distances.

As noted above, fibers may also be prepared directly from extrusion processes including centrifugal spinning, melt-spinning, spunbonding and melt-blowing.

In centrifugal spinning, fibers are formed as a polymer melt is accelerated from a rapidly rotating source. Molten material from a furnace is transferred into a rotating spinner, and the fibers are produced as centrifugal force extrudes the material through small holes in the side of the spinning device.

In melt spinning, the fiber-forming substance is melted for extrusion through a spinneret and then directly solidified by cooling. Melt spun fibers can be extruded from the spinneret in different cross-sectional shapes (round, trilobal, pentalobal, octalobal, and others). In-line drawing is effected by wrapping the moving threadline around sets of rotating rolls running at controlled temperature and speeds. Depending on the specific melt spinning process and subsequent processing steps, product can be collected as monofilaments, yarn, tow or nonwoven (e.g. spunbond). See *Fibers from Synthetic Polymers*, Rowland Hill, ed., Elsevier Publishing Co., N.Y., 1953 for a general reference regarding melt spun fibers.

Spunbonding is the direct laydown of nonwoven textile webs from fibers as they are melt-spun. Continuous filaments are extruded through a spinneret, accelerated (via rolls or jets) and laid down onto a moving belt to form a nonwoven sheet. Bonding occurs at molten fiber crossover points.

Meltblowing is another direct laydown process in which fibers are extruded through a die tip, attenuated (and fractured) by hot, high velocity air, and deposited onto a moving belt or screen to form a textile web of fine (low denier) fibers.

Both spunbond (S) and meltblown (M) textile webs, after being formed, can be further bonded and/or patterned by calendering. Multiple layered nonwovens (e.g. SMS, SMMS, SMMMS) can also be prepared from fibers of this invention.

This invention further provides an oriented melt-spun fiber prepared from a composition as described above. Preferred oriented melt-spun fibers include:

Preferred A. The fiber wherein X comprises an alkyl acrylate that is present in said ethylene/alkyl acrylate copolymer in a range from about 5 to about 35 weight %.

Preferred B. The fiber of Preferred A wherein said alkyl acrylate is present in said ethylene/alkyl acrylate copolymer in a range from about 10 to about 35 weight %.

Preferred C. The fiber of Preferred B wherein said alkyl acrylate is selected from the group consisting of methyl acrylate, ethyl acrylate and butyl acrylate.

Preferred D. The fiber of Preferred C wherein said alkyl acrylate is methyl acrylate.

Preferred E. The fiber of any of Preferred A through Preferred D wherein component (b) is present in an amount from 1 to 7 weight %.

Preferred F. The fiber of any of Preferred A through Preferred E further comprising (c) from 0.01 to 15 weight % of at least one additional component selected from the group consisting of fillers, delustrants, thermal and ultraviolet stabilizers, ultraviolet absorbers, antistatic agents, terminating agents, fluorescent whitening agents, pigments and other additives.

Preferred G. The fiber of Preferred F wherein the at least one additional component (c) is present in an amount between 0.1 and 5 weight %.

Preferred H. The fiber of any of Preferred A through Preferred G wherein said composition comprises a tubular reactor produced ethylene/alkyl acrylate copolymer.

Of particular note are fibers wherein Y is a functionalized comonomer, such as a maleic anhydride, maleic acid, or maleic acid diester or monoester. Preferably, the residues of maleic acid or its half ester, when present, are at least partially neutralized to form an ionomer. The preferred cations and neutralization levels are as described above. Also of note are fibers comprising E/MAA/MAME, a copolymer that is available in ionomer form from DuPont under the trademark Surlyn®.

Nonwoven, woven, or knitted textiles can be prepared from the fibers described above. Preferred nonwoven, woven, or knitted textiles are prepared from the preferred fibers above.

Fibers prepared as described herein, including slit tape fibers, are useful for preparing cords, twines or ropes. A number of fibers are joined together by, for example, twisting, braiding, interlacing and the like to form a cord. Twines, in general, contain a lower number of fibers and are smaller in diameter than ropes. These cords, twines or ropes may be roughly circular or flattened in cross section. Cords and twines can be used for shoelaces, straps for bags, briefcases and the like, and can be used in packaging applications. Ropes can be used in a wide variety of industrial and marine applications. Cords, twines and ropes may also be further interlaced (such as by knitting) to prepare nets having a relatively open structure, such as fishing nets, cargo nets and the like.

Slit tape fibers of this invention can be used as monofilament fibers for carpet tufting, synthetic lawns, matting and the like. They can also be used as strapping. When an adhesive is applied they can be used as adhesive tapes for uses such as strapping, in furniture or bonding materials together.

Woven or knitted textiles can be prepared from the slit tape fibers or melt-spun fibers as described above. In general, woven fabrics may have a tighter construction than knitted fabrics. Polyamide yarns prepared as described herein can be woven into fabrics used in applications such as filters, tarpaulins, sails, boat tops, covers, awnings, tents, escape slides, canopies, banners, construction (e.g. roofing) membranes, machine belts, liners for luggage or packaging, heavy duty sacking, carpet backing, book covers, footwear, upholstery for use in home furniture, motor vehicles, boats, aircraft and the like, apparel, agrotextiles (for use in seed control, weed control, gardening, greenhouses and silage) and geotextiles (for erosion control and soil conservation). Knitted fabrics can be used for sacking for use in carrying bulky materials such as groceries, firewood and the like; and construction and industrial netting.

Woven fabrics according to the invention have a lower slip tendency, which is particularly useful in fabricating heavy-duty sacks.

Nonwoven fabrics of this invention can be used in medical apparel such as hats, gowns, booties, and personal protective equipment including masks and the like, hygiene protective furnishings such as drapes, covers, blankets and the like, packaging, durable paper, wipes, wraps, banners, geotextiles, agrotextiles, upholstery, apparel, filters, liners, construction wrap for heat and moisture control in buildings, or roofing membranes.

Geotextiles are used in roads under the gravel and paving layers to improve road quality. Geotextile fabrics are typically manufactured by weaving polyamide tapes having approximately 2.5 mm width. Geotextiles are also prepared from spunbonded nonwoven material derived from melt-spun fibers. Shrinkage requirements for geotextiles are not as stringent as those for carpet backings. However, resistance to perforation is desirable for geotextiles.

The following Examples are merely illustrative, and are not to be construed as limiting the scope of the invention.

EXAMPLES 1 THROUGH 9

Films from nylon 66 compositions were extruder cast and oriented at elevated temperature. The tensile properties were then evaluated at room temperature. Melt indices (MI) reported herein were determined according to ASTM 1238 at 190° C. using a 2160 g weight, with values reported in units of grams/10 minutes.

Materials Used

PA-1: Nylon 66 (polyhexamethylene adipamide) homopolymer (RV=50), available from INVISTA, Canada.

EMA-A: Ethylene/methyl acrylate copolymer with 20% methyl acrylate, having an MI of 8 g/10 min, (ASTM D-1238, 190° C. using a 2.16 Kg mass), available from DuPont.

Resin Formulations

Comparative Examples C1 and C2: PA-1 (100%)

Examples 1 through 5: PA-1 (97.5 weight %)+EMA-A (2.5 weight %)

Examples 6 through 9: PA-1 (95 weight %)+EMA-A (5 weight %)

Samples were mixed in a Werner & Pfleiderer, ZSK-83 R 240, 83 mm diameter, twin screw extruder, extruded through an 84-inch (2.13 m) coat-hanger die at about 500 kg/hour, and cast onto a chill roll at a temperature of 65° C. at about 113 feet per minute resulting in 4-mil thick as-cast film. Torque in the extruder was measured, as a percentage of maximum extruder torque, to serve as an indicator of processability and energy consumption (Table 1). The film was then slit in line to a finished width of 1.7 m. The casting line has three main process rolls, a chill roll for cooling the melt, an annealing roll for reheating the film for stress relief and the final cooling roll for cooling the film back to room temperature before wind up. The melt from the extruder left the die at about 275 to 280° C. before making contact with the chill roll.

TABLE 1

| Composition | Torque (%) |
| --- | --- |
| PA-1 (100%) | 68 ± 1 |
| PA-1 (97.5 weight %) + EMA-A (2.5 weight %) | 65 ± 1 |
| PA-1 (95 weight %) + EMA-A (5 weight %) | 63 ± 1 |

Table 1 shows that polyamide modified according to this invention can be processed through the extruder at lower torque.

The cast film was subsequently drawn in a 94-inch-wide, uniaxial off-line orienter consisting of six main process rolls. These six rolls were double-walled with a heat transfer fluid circulating for temperature control. The temperature was controlled within ±2° C. across the roll face. The first two rolls were for reheating the film above its glass transition temperature. The third (slow draw roll) was held at 115° C., the fourth roll (high draw roll) was held at 155° C., the fifth roll was the annealing roll or heat setting roll and the sixth roll was the chill roll for cooling the film back to room temperature. The gap between the third and fourth rolls was approximately 0.064 inch (1.6 mm).

Tensile properties were then measured by stretching the oriented film (4-inch (10 cm) specimens at 2 inches (5 cm)/minute crosshead speed) at room temperature, according to ASTMD-882 and ASTMD-638. The results are reported in Table 2 wherein YS denotes yield stress, BS stands for break stress, SAB denotes strain at break, and the numbers in the parentheses are for standard deviations.

TABLE 2

| Example | Draw Ratio | Modulus (ksi) | YS (ksi) | BS (ksi) | SAB (ksi) |
| --- | --- | --- | --- | --- | --- |
| C1 | 3.3X | 330 (14) | 29 (2) | 29 (2) | 21 (1) |
| C2 | 4.0X (max) | 404 (17) | 34 (14) | 34 (4) | 15 (1) |
| 1 | 3.3X | 381 (15) | 29 (2) | 29 (2) | 23 (5) |
| 2 | 4.0X | 377 (42) | 31 (2) | 31 (2) | 16 (1) |
| 3 | 4.2X | 458 (42) | 35 (5) | 35 (5) | 13 (1) |
| 4 | 4.7X | 484 (12) | 36 (2) | 36 (2) | 12 (1) |
| 5 | 5.0X (max) | 446 (21) | 35 (5) | 35 (5) | 12 (1) |
| 6 | 3.3X | 363 (18) | 30 (2) | 30 (2) | 24 (5) |
| 7 | 4.2X | 411 (26) | 32 (3) | 32 (3) | 15 (2) |
| 8 | 4.5X | 435 (38) | 38 (3) | 38 (3) | 12 (1) |
| 9 | 5.0X (max) | 475 (36) | 33 | 33 | 13 (1) |

These results show that films of polyamide modified can be drawn to higher draw ratios than nonmodified polyamide, resulting in improved mechanical properties as tested at room temperature. By inference, in a process operating at constant draw ratio, films of modified polyamide could be drawn with fewer breaks (higher yield) than comparable films of nonmodified polyamide.

EXAMPLE 10

Films were prepared from nylon 6 compositions. Tapes were cut from the films and these were then drawn at elevated temperatures. The tensile properties were then evaluated at room temperature.

Materials Used

PA-2: Nylon 6 homopolymer available from BASF as Ultramid B35.

EMA-B: Ethylene/methyl acrylate copolymer with 24% methyl acrylate, having an MI of 2 g/10 min, (ASTM D-1238, 190° C. using a 2.16 Kg mass), available from DuPont.

Resin Formulations

Comparative Example C3; PA-2 (100%)
Example 10: PA-2 (97.5%)+EMA-B (2.5%)

Samples were mixed in a 28 mm twin-screw extruder, extruded through a coat-hanger die, and quench cast onto a chill roll to give a film 5 to 6 mil in thickness. During extrusion, the addition of EMA-B to the polyamide reduced the amperage drawn by the extruder from 16 to 12 amps and reduced the pressure in the extruder from 780 to 680 psi, compared to the nonmodified polyamide. These results indicate that polyamides modified according to this invention can reduce energy consumption during processing.

One-quarter-inch-wide (6 mm) tapes were cut from the film in the machine direction. Within two hours, these tapes were drawn in a tensile testing machine fitted with an oven maintained at 50° C., at a rate of 2,000 % per minute to over four times (4×) the original length. Tensile properties were then measured by stretching at room temperature at 100% per minute and are reported, as averages of four samples, in Table 3.

TABLE 3

| Example | Composition | Draw Ratio | Modulus (ksi) | Tensile Strength (psi) | Elongation at Break (%) |
|---|---|---|---|---|---|
| C3 | 100% PA-2 | 4.3X | 286 | 71490 | 39 |
| 10 | 97.5% PA-2 + 2.5% EMA-B | 4.2X | 290 | 72240 | 71 |

These results show that the mechanical properties of films drawn at higher temperatures and tested at room temperature were improved using polyamides modified according to this invention.

The invention claimed is:

1. An article comprising, or prepared from, a composition which comprises (a) at least one polyamide polymer; and (b) at least one E/X/Y copolymer wherein
the article is an oriented film or an oriented fiber that has been drawn at a temperature below the melting point of the polyamide polymer to a draw ratio greater than 10:1;
the amount of the E/X/Y copolymer is from 0.1 to 20 weight %, based on the total weight of the composition;
E represents copolymerized residues of ethylene;
X represents conolymerized residues of at least one comonomer selected from the group consisting of vinyl acetate and alkyl (meth)acrylic esters;
Y represents copolymerized residues of one or more comonomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters, and salts thereof, glycidyl acrylate, glycidyl methacrylate, and glycidyl vinyl ether; and
the amount of X is from 0 to 50 weight % and the amount of Y is from 0 to 35 weight %, based on the total weight of the E/X/Y copolymer, the weight % of X and Y cannot both be 0, and the remainder of the E/X/Y copolymer comprises copolymerized ethylene E.

2. The article of claim 1 wherein the amount of the at least one E/X/Y copolymer is from 0.5 to 10 weight %, based on the total weight of the composition, and further wherein the at least one E/X/Y copolymer comprises an ethylene/alkyl acrylate copolymer.

3. The article of claim 2 wherein the ethylene/alkyl acrylate copolymer comprises from about 5 to about 35 weight % of copolymerized alkyl acrylate residues, based on the total weight of the ethylene/alkyl acrylate copolymer.

4. The article of claim 2 wherein the ethylene/alkyl acrylate copolymer cormprises from about 10 to about 30 weight % of copolymerized alkyl acrylate residues, based on the total weight of the ethylene/alkyl acrylate copolymer.

5. The article of claim 2 wherein the alkyl acrylate comprises one or more comonomers selected from the group consisting of methyl acrylate, ethyl acrylate, and butyl acrylate.

6. The article of claim 5 wherein the alkyl acrylate comprises methyl acrylate.

7. A tape comprising or produced by slitting an oriented film of claim 6.

8. An oriented fiber prepared by hot-drawing and, optionally, annealing a tape of claim 7.

9. A nonwoven, woven, or knitted textile comprising, or prepared from, an oriented fiber of claim 6.

10. The article of claim 2 wherein the ethylene/alkyl acrylate copolymer is produced in a tubular reactor.

11. A tape comprising or produced by slitting an oriented film of claim 10.

12. An oriented fiber prepared by hot-drawing and, optionally, annealing a tape of claim 11.

13. A tape comprising or produced by slitting an oriented film of claim 2.

14. An oriented fiber prepared by hot-drawing and, optionally, annealing a tape of claim 13.

15. A nonwoven, woven, or knitted textile comprising, or prepared from, an oriented fiber of claim 2.

16. The article of claim 1 further comprising (c) from 0.01 to 20 weight %, based on the total weight of the composition, of at least one additional component selected from the group consisting of fillers, delustrants, thermal and ultraviolet stabilizers, ultraviolet absorbers, antistatic agents, terminating agents, fluorescent whitening agents, pigments, and other additives.

17. The article of claim 16 wherein component (b) is present in an amount of from 0.1 to 15 weight %, based on the total weight of the composition.

18. A tape comprising or produced by slitting an oriented film of claim 17.

19. An oriented fiber prepared by hot-drawing and, optionally, annealing a tape of claim 18.

20. A nonwoven, woven, or knitted textile comprising, or prepared from, an oriented fiber of claim 17.

21. The article of claim 16 wherein component (b) is present in an amount of from 1 to 7 weight %, based on the total weight of the composition.

22. The article of claim 1 wherein the polyamide polymer comprises polyepsiloncaprolactam, polyhexamethylene adipamide, or both polyepsiloncaprolactam and polyhexamethylene adipamide.

23. The article of claim 22 being a biaxially oriented film, wherein the polyamide polymer comprises polyepsiloncaprolactam and the at least one E/X/Y copolymer comprises at least one ethylenelalkyl acrylate copolymer.

24. A tape comprising or produced by slitting an oriented film of claim 23.

25. An oriented fiber prepared by hot-drawing and, optionally, annealing a tape of claim 24.

26. A tape comprising or produced by slitting an oriented film of claim 1.

27. An oriented fiber prepared by hot-drawing and, optionally, annealing a tape of claim 26.

28. An oriented fiber of claim 1 that is a melt spun fiber.

29. The oriented fiber of claim 28 wherein Y represents copolymerized residues of one or more comonomers selected from the group consisting of maleic anhydride, maleic acid, a diester or monoester of maleic acid, a salt of maleic acid and a salt of a monoester or diester of maleic acid.

30. The oriented fiber of claim 28, wherein the polyamide polymer comprises nylon 6, nylon 66, nylon 612, nylon 11, nylon 12, or a blend of two or more thereof.

31. The article of claim 1 wherein the amount of the E/X/Y copolymer is from 0.1 to 15, weight %, based on the total weight of the composition.

* * * * *